UNITED STATES PATENT OFFICE.

JOHN T. SMITH, OF SAN FRANCISCO, AND JOHN W. COPELAND, OF REDDING ASSIGNORS OF ONE-THIRD TO ISAAC ATWOOD, OF REDDING, CALIFORNIA.

TANNING COMPOSITION.

SPECIFICATION forming part of Letters Patent No. 453,295, dated June 2, 1891.

Application filed July 29, 1890. Serial No. 360,315. (No specimens.)

*To all whom it may concern:*

Be it known that we, JOHN T. SMITH, of the city and county of San Francisco, State of California, and JOHN W. COPELAND, of Redding, county of Shasta, State aforesaid, have invented a new and useful Compound for Tanning Leather, of which the following is a specification.

The object of our invention is to provide a cheap and convenient substitute for oak-bark and other vegetable products commonly used in the preparation of tan-liquors.

There is such an increasing consumption of oak-bark and similar tans that it is feared the supply will soon be inadequate to the demand, or at least the cost of these staples will be so heightened as to work injury to the leather industry. Much more to be dreaded, perhaps, is the unrestrained destruction of some of our most valuable trees, which is brought about by the exigencies of the trade. It has been our aim in devising our tanning compound to avoid these evils, and we have succeeded in so far that the ingredients composing it are obtained from trees of lower grade which are found in great abundance in this country and may be easily propagated, so as to create an inexhaustible supply.

Our invention therefore relates to tanning substances; and it consists of a mixture of different decoctions from the bark, leaves, and twigs of the manzanita, eucalyptus, and madrona, technically known, respectively, as *Arbutus menziesii, Eucalyptus globules,* and *Arctostaphylos pungeus.* It is prepared as follows:

We take various quantities of dried twigs and leaves from the manzanita and dried bark and leaves from the eucalyptus and madrona. These are broken or ground separately and put into soft water in the proportion of one pound of manzanita to five gallons of water, one pound and a half of eucalyptus to four gallons of water, and one pound and a half of madrona to five gallons of water. The three baths are next boiled until the water is charged with the tannin of the immersed substances, when they are allowed to cool off and the several extracts mixed together in equal parts, stirring up well. The tan-liquor is made from this compound by using five gallons of pure soft water for each pound of the mixture. The hides or skins having been cleaned, softened, and unhaired, as usual, are steeped in this liquor until thoroughly saturated. They are then removed and hung out in the sun or dried by any suitable process, to be afterward curried and dressed.

The preparation just described possesses a good percentage of the tanning principles, and in our opinion is fully equal to the more renowned extracts. It can be used for tanning all kinds of skins, such as that of goats, sheep, calves, deer, elks, as well as kips and the heaviest bullock hides.

Manzanita is used owing to its large percentage of tannin; but it is of a fiery nature and would make inferior leather if used alone. Madrona is poorer in tannin, but has the advantage of tempering the manzanita. Eucalyptus is employed because of its oily nature. This tree, commonly called the "Australian blue-gum," is full of oil, and therefore imparts a smoothness to leather difficult to obtain otherwise. It has tannin also, but not a great deal.

Having thus described our invention, what we claim as new, and desire to secure protection in by Letters Patent of the United States, is—

1. The herein-described composition of matter, which consists of mixed decoctions from the twigs, leaves, and bark of the manzanita, eucalyptus, and madrona, substantially as and for the purpose set forth.

2. The herein-described composition for tanning leather, which consists of a mixture of equal parts of decoctions from the dried bark, leaves, and twigs of the manzanita, eucalyptus, and madrona, compounded substantially as and in the proportions set forth.

In testimony whereof we have hereunto set our hands and affixed our seals.

JOHN T. SMITH, [L. S.]
JOHN W. COPELAND. [L. S.]

In presence of—
A. H. STE. MARIE,
W. D. BIEGLE.